(12) United States Patent
Muth

(10) Patent No.: US 11,038,714 B2
(45) Date of Patent: Jun. 15, 2021

(54) CONTROLLER AREA NETWORK TRANSCEIVER

(71) Applicant: NXP B.V., Eindhoven (NL)

(72) Inventor: Matthias Berthold Muth, Stelle (DE)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/885,260

(22) Filed: May 27, 2020

(65) Prior Publication Data
US 2020/0382340 A1 Dec. 3, 2020

(30) Foreign Application Priority Data

May 29, 2019 (EP) .................................... 19177401
Feb. 12, 2020 (EP) .................................... 20156840

(51) Int. Cl.
*H04L 12/40* (2006.01)
*H04L 12/413* (2006.01)

(52) U.S. Cl.
CPC .... *H04L 12/4135* (2013.01); *H04L 12/40013* (2013.01); *H04L 12/40039* (2013.01); *H04L 2012/40215* (2013.01)

(58) Field of Classification Search
CPC ................... H04L 12/40013; H04L 12/40039
See application file for complete search history.

(56) References Cited

U.S. PATENT DOCUMENTS

| | | | |
|---|---|---|---|
| 10,164,792 B2 | 12/2018 | Hehemann et al. | |
| 10,355,876 B2* | 7/2019 | Kishigami | H04L 12/40 |
| 10,778,481 B1* | 9/2020 | Glenn | H04L 25/4902 |
| 2007/0232239 A1 | 10/2007 | Der et al. | |
| 2012/0314784 A1 | 12/2012 | Pratt et al. | |
| 2014/0156893 A1 | 6/2014 | Monroe et al. | |
| 2015/0222455 A1* | 8/2015 | Ohtsuka | H04L 25/0272 375/219 |
| 2017/0070366 A1* | 3/2017 | Hehemann | H04L 12/4013 |

(Continued)

FOREIGN PATENT DOCUMENTS

| | | |
|---|---|---|
| EP | 3 211 802 A1 | 8/2017 |
| EP | 3 217 602 A1 | 9/2017 |

(Continued)

*Primary Examiner* — Henry Tsai
*Assistant Examiner* — Christopher A Daley
(74) *Attorney, Agent, or Firm* — Rajeev Madnawat

(57) ABSTRACT

A Controller Area Network, CAN, transceiver comprising a receiver arrangement for coupling to a CAN bus and configured to determine a differential signal from analog signalling received from the CAN bus; and a receive output for coupling to a CAN controller and wherein the receiver arrangement provides a digital output signal to the receive output based on the differential signal; wherein the receiver arrangement operates in at least a first mode in which it is configured to provide the digital output signal comprising logic 0 when the differential signal is greater than a first receiver threshold and provide the digital output signal comprising logic 1 when the differential signal is less than said first receiver threshold unless said differential signal satisfies a condition, whereupon the receiver arrangement is configured to provide the digital output signal comprising logic 0, wherein the condition comprises the differential signal being below an activity-voltage threshold.

18 Claims, 8 Drawing Sheets

(56) References Cited

U.S. PATENT DOCUMENTS

| | | | |
|---|---|---|---|
| 2020/0097433 A1* | 3/2020 | Qi | ........................ G06F 13/4282 |
| 2020/0169431 A1* | 5/2020 | Walker | .............. H04L 12/40032 |
| 2021/0001788 A1 | 1/2021 | De Haas | |
| 2021/0006430 A1 | 1/2021 | De Haas | |

FOREIGN PATENT DOCUMENTS

| EP | 3 297 247 A1 | 3/2018 |
|---|---|---|
| EP | 3 445 003 A1 | 2/2019 |
| EP | 3 691 197 A1 | 8/2020 |
| EP | 3772839 A1 | 2/2021 |

\* cited by examiner

| ARBRITA-TION | Min [V] | Typ [V] | Max [V] |
|---|---|---|---|
| TXD VDIFF (DOM) | 1.5 | 2 | 3 |
| TXD VDIFF (ZREC) | -0.5 | 0 | 0.05 |
| RXD VDIFF (TH_ARB) | 0.5 | 0.7 | 0.9 |

| DATA-PHASE | Min [V] | Typ [V] | Max [V] |
|---|---|---|---|
| VDIFF (ONE) | 0.6 | 1 | 1.5 | TXD |
| VDIFF (ZERO) | -1.5 | -1 | -0.6 | TXD |
| VDIFF (TH_DAT) | -0.1 | 0 | +0.1 | RXD |

CONTROLLER AREA NETWORK TRANSCEIVER

CROSS-REFERENCE TO RELATED APPLICATIONS

This application claims the priority under 35 U.S.C. § 119 of European patent application no. 19177401.7, filed on May 29, 2019, and European patent application no. 20156840.9, filed on Feb. 12, 2020, the contents of which are incorporated by reference herein.

FIELD

The present disclosure relates to controller area network (CAN) transceiver, a CAN node comprising a CAN controller in combination with said CAN transceiver and a method of operating a CAN transceiver.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. But the standardized CAN data link layer protocol is still in further process of being extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard. However, it is of interest to allow backwards compatibility between all the CAN flavours, for example, CAN XL with CAN FD.

SUMMARY

According to a first aspect of the present disclosure there is provided a Controller Area Network, CAN, transceiver comprising:
 a receiver arrangement for coupling to a CAN bus, the receiver arrangement configured to determine a differential signal from analog signalling received from the CAN bus; and
 a receive output for coupling to a CAN controller and wherein the receiver arrangement is configured to provide a digital output signal to the receive output based on the differential signal; wherein
 the receiver arrangement is configured to operate in at least a first mode in which the receiver arrangement is configured to provide the digital output signal comprising logic 0 when the differential signal is greater than a first receiver threshold and provide the digital output signal comprising logic 1 when the differential signal is less than said first receiver threshold unless said differential signal satisfies a condition, whereupon the receiver arrangement is configured to provide the digital output signal comprising logic 0, wherein the condition at least comprises the differential signal being below an activity-voltage threshold.

In one or more examples, the CAN transceiver comprises a transmit input for coupling to said CAN controller and to receive a transmit signal therefrom, the CAN transceiver further comprising a transmitter arrangement coupled to the transmit input to receive the transmit signal and configured for coupling to the CAN bus, the transmitter arrangement configured to provide analog signalling to the CAN bus based on the transmit signal.

In one or more embodiments, the activity-voltage threshold is below the first receiver threshold.

In one or more embodiments, the receiver arrangement is configured to operate in either a second mode or the first mode based on signalling received from the CAN controller, wherein in the second mode the receiver arrangement is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold.

In one or more embodiments, the activity-voltage threshold is below the second receiver threshold.

In one or more embodiments, the second receiver threshold is below the first receiver threshold.

In one or more embodiments, said condition further comprises the differential signal being below the activity-voltage threshold for at least a period of time greater than a persistence-time-threshold. In one or more examples, said persistence-time-threshold is implemented using a filter.

In one or more examples, the persistence-time-threshold is less than 100 ns. In one or more examples, the persistence-time-threshold is more than 50 ns. In one or more examples, the receiver arrangement includes a filter configured to filter out occurrences of the condition being met that persist for less than a persistence-time-threshold.

In one or more embodiments, in the first mode, the receiver arrangement is configured to receive analog signalling from the CAN bus with a defined level scheme corresponding to the level scheme according to the CAN protocol, such as defined in ISO11898-2:2016.

In one or more embodiments, the activity-voltage threshold is between −0.1 Volts and −0.6 Volts. It will be appreciated that −0.6V is an example and the voltage may be between −0.8V and −0.4V or other ranges. It will be appreciated that the lower bound may be any value between −0.2 and −1.5V and the upper bound may be any value between −0.6V and +0.4V.

In one or more embodiments, said condition further comprises the differential signal being below the activity-voltage threshold a predetermined number of times since the differential signal was last greater than the first receiver threshold.

In one or more embodiments, the receiver arrangement comprises:

a first receiver configured to compare the differential signal with the first receiver threshold and output logic 0 when the differential signal is greater than a first receiver threshold and output logic 1 when the differential signal is less than said first receiver threshold; and a second receiver configured to compare the differential signal with the activity-voltage threshold and output logic 0 when the differential signal is less than the activity-voltage threshold and output logic 1 when the differential signal is greater than said activity-voltage threshold;

a logic AND combiner configured to receive the output from both the first receiver and the second receiver and provide the digital output signal to the receive output based on said outputs.

In one or more examples, the receiver arrangement comprises a time filter between the output of the second receiver and said logic AND module, the time filter configured filter out changes in the output of the second receiver that persist for less than a persistence-time-threshold.

In one or more embodiments, the said second receiver is switchable between using the activity-voltage threshold for use in the first mode and a second receiver threshold for providing a second mode, wherein in the second mode the second receiver is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold and wherein the receiver arrangement includes a signal selector configured to select the output of the second receiver in the second mode for passing to the receive output and to select the output of the logic AND combiner in the first mode for passing to the receive output.

In one or more examples, the receiver arrangement comprises a third receiver configured to use the second receiver threshold for providing a second mode, wherein in the second mode the third receiver is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold, and wherein in the first mode, the digital output signal is determined by the output of the first and second receivers and in the second mode the digital output signal is determined by the output of the third receiver.

In one or more examples, the receiver arrangement may comprise a single receiver configured to compare the differential signal to each of the activity-voltage threshold, the first receiver voltage and the second receiver voltage in providing the digital output signal for the first and second modes.

In one or more embodiments, the receiver arrangement comprises a counter between the second receiver and the logic AND combiner, the counter configured to count the occurrences of the second receiver outputting logic 0 indicative of when the differential signal is less than the activity-voltage threshold and wherein the counter is configured to provide a logic 0 to the logic AND combiner based on a predetermined number of occurrences and wherein said counter is reset based on a logic 0 output from the first receiver.

According to a second aspect of the disclosure, we provide a CAN node comprising a CAN controller coupled with a CAN transceiver of the first aspect wherein a receive input of the CAN controller is coupled with the receive output of the CAN transceiver for receiving the digital output signal for processing in accordance with the CAN protocol by the CAN controller, and the CAN controller configured to generate a transmit signal in accordance with the CAN protocol and provide said transmit signal to a transmit output of the CAN controller that is coupled with a transmit input of the CAN transceiver, the transmit input coupled to a transmit arrangement of the CAN transceiver for providing said analog signalling to the CAN bus based on said transmit signal received at the transmit input from the CAN controller.

In one or more embodiments, said CAN protocol comprises the CAN FD protocol. Thus, the CAN controller operating based on the CAN FD protocol of ISO11898-1: 2015 may be able to benefit from the CAN transceiver's use of the activity-voltage threshold to reliably remain in the protocol exception state that is used when signalling other than CAN FD signalling is present on the CAN bus, such as the proposed CAN XL signalling.

In one or more examples, the CAN protocol comprises the proposed CAN XL protocol and wherein the CAN controller is configured to, based on the CAN controller determining the current or upcoming use of CAN XL based signalling on the CAN bus, provide mode signalling to the CAN transceiver to switch to the second mode.

According to a third aspect of the disclosure we provide a method of operating a CAN transceiver comprising a receiver arrangement for coupling to a CAN bus, the receiver arrangement configured to determine a differential signal from analog signalling received from the CAN bus; and a receive output for coupling to a CAN controller and wherein the receiver arrangement is configured to provide a digital output signal to the receive output based on the differential signal; wherein then method comprises:

operating the receiver arrangement in at least a first mode wherein in the first mode the method comprises:
providing, by the receiver arrangement, the digital output signal comprising logic 0 when the differential signal is greater than a first receiver threshold; and
providing, by the receiver arrangement, the digital output signal comprising logic 1 when the differential signal is less than said first receiver threshold unless said differential signal satisfies a condition, whereupon the method comprises providing the digital output signal comprising logic 0, wherein the condition at least comprises the differential signal being below an activity-voltage threshold.

In one or more examples, the method comprises
operating the receiver arrangement in a second mode instead of the first mode based on signalling received from the CAN controller wherein in the second mode the method comprises:
providing, by the receiver arrangement, the digital output signal comprising logic 0 when the differential signal is greater than a second receiver threshold; and
providing, by the receiver arrangement, the digital output signal comprising logic 1 when the differential signal is less than said second receiver threshold, the second receiver threshold different to the first receiver threshold.

According to a further aspect of the present disclosure there is provided a CAN transceiver configured to receive from a CAN bus analog signals according to a first defined level scheme having a first receiver threshold with differential bus voltages above the first receiver threshold corresponding with digital output signals level 0 and differential bus voltages below the first receiver threshold corresponding with digital output signals level 1, and analog signals according to a second defined level scheme having a second receiver threshold with differential bus voltages above the second receiver threshold corresponding with digital output signals level 0 and differential bus voltages below the second threshold corresponding with digital output signals level 1; and, during a default operation mode, configured to output to a CAN controller digital output signals according to the first defined level scheme, but to output, on receipt of analog signals with differential bus voltages below a third receiver threshold, digital output signals level 0, notwithstanding the first defined level scheme.

In one or more embodiments, the CAN transceiver of the further aspect, wherein the third receiver threshold is below the first receiver threshold.

In one or more embodiments, the first defined level scheme has a typical differential driver output voltage corresponding to digital signals level 1, which is above a maximum differential driver output voltage corresponding with digital signal level 1 according to the second level scheme, and wherein the third receiver threshold is below the typical differential driver output voltage corresponding to digital signals level 1 of the first defined level scheme.

In one or more embodiments, the typical differential driver output voltage corresponding to digital signals level 1 of the first defined level scheme is 0 V.

In one or more embodiments, the first defined level scheme corresponds with the level scheme according to CAN protocol ISO11898:2-2016.

In one or more embodiments, the third receiver threshold is above the maximum differential driver output voltage corresponding with digital signal level 1 according to the second defined level scheme.

In one or more embodiments, the maximum differential driver output voltage corresponding with digital signal level 1 according to the second defined level scheme is −0.6V. It will be appreciated that −0.6V is an example and the voltage may be between −0.8V and −0.4V or other ranges.

In one or more embodiments, the second defined level scheme corresponds with the level scheme according to CAN XL during data phase.

In one or more embodiments, the third receiver threshold is −0.3V differential bus voltage. It will be appreciated that −0.3V is an example and the voltage may be between −0.5V and −0.1V or other ranges.

In one or more embodiments, the third receiver threshold is −0.4V differential bus voltage. It will be appreciated that −0.4V is an example and the voltage may be between −0.6V and −0.2V or other ranges.

In one or more embodiments, wherein the digital output signals level 0, output on receipt of analog signals with differential bus voltages below the third receiver threshold, are equal or greater than a minimum length. Optionally, the minimum length is the expected bit length of the digital signals according to the second defined level scheme. Optionally, the minimum length is 100 ns. It will be appreciated that the 100 ns minimum length is an example and could be revised based on development of the protocol.

In one or more embodiments, the digital output signals level 0, output on receipt of analog signals with differential bus voltages below the third receiver threshold, exceed a minimum number of prior bit transitions below the third receiver threshold.

In one or more embodiments, the CAN transceiver is further configured to output to a CAN controller, during a non-default operation mode, digital signals according to the second defined level scheme.

According to a still further aspect of the disclosure a CAN device comprising a CAN controller, and a CAN transceiver according to the further aspect of the disclosure.

According to a final aspect of the disclosure, we provide a method for operating a CAN transceiver configured to receive from a CAN bus analog signals according to a first defined level scheme having a first receiver threshold with differential bus voltages above the first receiver threshold corresponding with digital output signals level 0 and differential bus voltages below the first receiver threshold corresponding with digital output signals level 1, and analog signals according to a second defined level scheme having a second receiver threshold with differential bus voltages above the second receiver threshold corresponding with digital output signals level 0 and differential bus voltages below the second threshold corresponding with digital output signals level 1, the method comprising:

receiving analog signals from a CAN bus; and, during a default operation mode, outputting to a CAN controller digital output signals according to the first defined level scheme, but outputting, on receipt of analog signals with differential bus voltages below a third receiver threshold, digital output signals level 0, notwithstanding the first defined level scheme.

In one or more embodiments, the method further comprises:

outputting to a CAN controller, during a non-default operation mode, digital signals according to the second defined level scheme.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
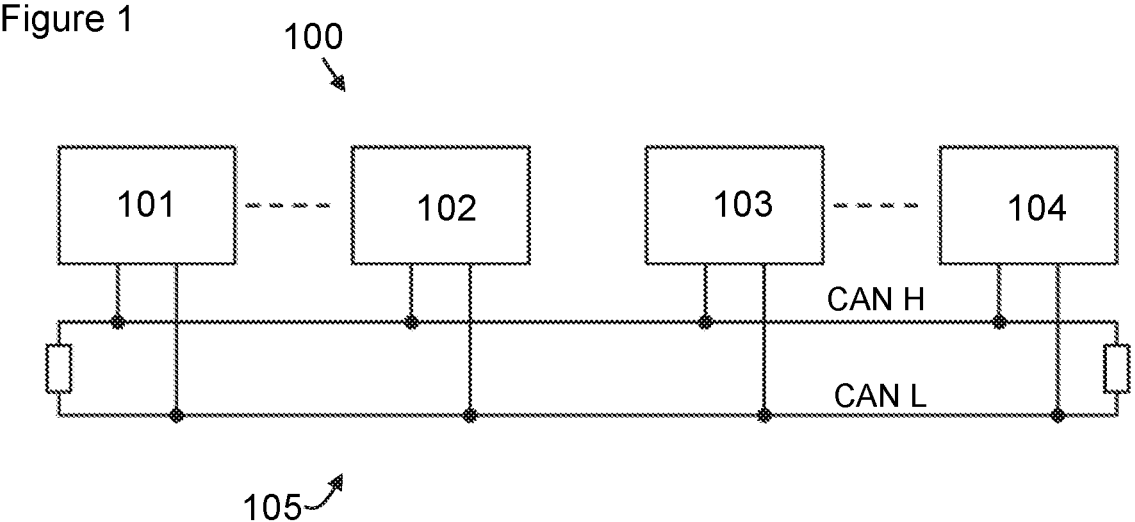
FIG. 1 shows an example embodiment of a plurality of CAN nodes connected to a common CAN bus.

Example FIG. 1 shows a CAN bus system 100 with a plurality of nodes or ECUs (Electronic Control Units) 101-104 connected to the same CAN bus wires 105 comprising a first CANH wire and a second CANL simultaneously. The nodes 101 and 102 comprise conventional CAN FD nodes that implement the CAN FD protocol. The nodes 103 and 104 comprise nodes that implement an extended version of the CAN protocol, such as the proposed CAN XL protocol. The CAN XL protocol is not known to the nodes 101, 102 that implement the CAN FD protocol.

Figure 2:
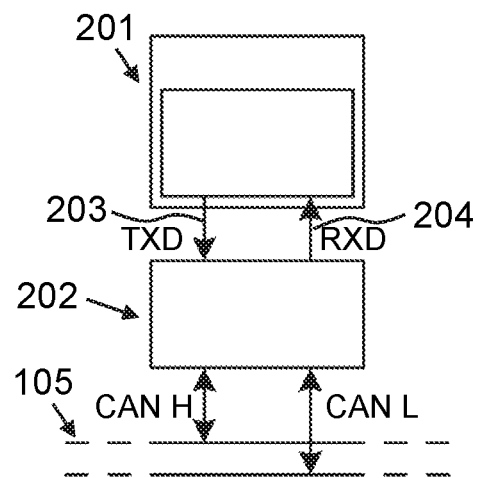
FIG. 2 shows an example CAN node comprising a CAN controller coupled with a CAN transceiver, the CAN transceiver providing the coupling to the CAN bus.

Example FIG. 2 shows one of the nodes 101-104 in more detail. A node mainly comprises a CAN controller 201, such as a microcontroller, that implements the CAN FD or CAN XL protocol such as by using an embedded CAN FD or CAN XL protocol controller. The controller 201 is connected to the CAN bus 105 by a CAN transceiver 202. The CAN controller 201 is connected to the CAN transceiver 202 through two interface connections called TXD (Transmit Data) 203 and RXD (Receive Data) 204. The controller may therefore have a transmit output that couples with a transmit input of the transceiver. Likewise, the transceiver may have a receive output that couples with a receive input of the controller. The transceiver 202 is used to convert transmit data comprising a digital bit stream on TXD 203 into analogue signalling on the bus wires 105. The transceiver 202 may also be used to convert analogue signalling from the bus 105 into receive data comprising a digital output signal or bit stream for providing to the RXD connection 204.

Currently a new flavour of the CAN protocol is in the definition phase called "CAN XL". This new CAN flavour shall be designed to be backwards compatible with the existing CAN FD protocol, which is achieved through use of a control bit within the CAN FD protocol bit stream. Thus, CAN FD provides, by using the aforementioned control bit, for a CAN FD controller implementation to be placed into a "protocol exception state", whenever a non-CAN or non-CAN FD, such as a CAN XL, frame is to be sent on the bus 105. The CAN FD protocol uses the detection of an idle bus 105 in a particular state to enable a CAN FD controller to leave the protocol exception state ready for new bus cycle with a new arbitration phase.

The present disclosure may relate to a transceiver concept configured to use the protocol exception state provided for in CAN FD. In one or more examples, the transceiver 202 is configured to ensure CAN FD controllers 201 are reliably kept in the protocol exception state even if one or more nodes are running the CAN XL protocol with a voltage level scheme that differs from the voltage level scheme for CAN or CAN FD. The voltage level scheme comprises the voltages used for signalling on the wires of the CAN bus. The modification of the voltage level scheme from that used by CAN and CAN FD may be useful for achieving higher bus speeds. In one or more examples, the transceiver described herein may make it possible to run both protocols, CAN FD and CAN XL, interleaved on the same bus wires 105 despite the use of a different voltage level scheme.

The introduction of a new CAN protocol variant is an issue if such introduction is not backwards compatible/interoperable. The introduction could mean a change of all involved electronics, such as both CAN transceivers and CAN controllers at each node in a network, without the possibility to have a smooth transition from one technology to the next. Therefore, it may be important to ensure compatibility and, optionally, interoperability with the old systems.

As mentioned, the CAN FD protocol has a function called "protocol exception state", which parks a CAN FD controller in a waiting loop until the bus 105 becomes free again. Within this state a CAN FD controller tolerates all kind of bus signalling, i.e. signalling that is non-compliant with the CAN FD protocol, without creating any errors. To stay within the protocol exception state, there must be dominant signals (i.e. a logic 0 differential signal)/dominant level changes on the receive input from the receive connection 204 towards the CAN FD controller in order to signal to the CAN FD controller that there is still activity on the bus. To leave the protocol exception state, the CAN FD controller looks for a period of no signals (i.e. a contiguous recessive signal over several bits) on the RXD connection 204 whereupon the bus 105 is regarded to be free again and the "not known" protocol has finished.

Currently the industry defines a new flavour of CAN called CAN XL. This new protocol variant makes use of the Protocol Exception State of CAN FD and is intended to keep the CAN FD controllers into the exception state until the CAN XL frame is finished. Therefore, it is assumed, that the CAN XL protocol creates the required dominant signal or dominant signal changes based on the CAN XL traffic at the RXD connection 204 so that the CAN FD controllers remain in the protocol exception state until the CAN XL traffic is complete.

The proposed CAN XL physical layer however specifies modifications in the voltage level scheme of the signalling of bits on the bus 105 wires in order to provide the desired bus speed performance. A result of this voltage level scheme is that there are potentially no dominant signal edges on the RXD connection 204 towards any CAN FD controllers that may be part of the network 100 because voltage tolerances of the voltage levels used on the bus 105 may result in dominant signalling not being detected by the CAN FD compliant CAN transceivers. In essence it may be that the CAN XL signalling uses voltage levels that are so low from amplitude perspective, that the CAN receiver with the classical receiver thresholds (as used in the CAN FD module) does not recognise any bus 105 activity anymore and the RXD connection 204 provided to the CAN FD controller may appear thereto as being continually recessive. As a consequence, the CAN FD controller would leave their protocol exception state too early and create errors, which may interfere with traffic on the bus 105.

A similar problem occurs, if a node is powered-up the first time, while other nodes in the system are already communicating with CAN XL protocol and levels. A node, which is powered up may start in the protocol exception state by default and then waits for the expiration of this exception state. It may be important that a node recognizes reliably the communication in CAN XL level scheme in order to stay in this exception state, until the bus is free again.

One or more examples of the present disclosure may be configured to reliably keep the CAN FD nodes in their protocol exception state during signalling on the bus 105 defined in the new proposed CAN XL physical layer. In one or more examples, nodes having CAN controllers that implement CAN FD and CAN XL protocol can be mixed on one and the same bus 105 without any restrictions. This may enable interleaved CAN FD and CAN XL communication on the same medium and may allow for integration of nodes into the network 100 after they are powered-up.

For bus speed reasons the CAN XL physical layer needs to switch the output and input behaviour, i.e. the voltage level scheme and, optionally, the signalling rate, depending on the phase of the protocol. At the beginning of a CAN XL frame, the well-known CAN FD or ISO 11898-2:2016 level scheme is used, which is also used for CAN FD nodes. This guarantees the interoperability/backwards compatibility of CAN FD with CAN XL at the beginning of the frames. This voltage level scheme is used for determining the node 101-104 that gains bus access through the known CAN Arbitration method.

After passing the decision point, which protocol is used (CAN FD or CAN XL) is signalled and the Physical Layer of CAN XL is changed to the CAN XL voltage level scheme or remains in the CAN FD voltage level scheme. In the case a CAN XL node 103, 104 has won the bus access, the CAN XL voltage level scheme may be used to provide stronger output drive with different output and input levels. This may be required to drive the bus with maximum physical speed. The old, CAN FD voltage level scheme was not optimized for speed and as such may not be suitable for very high bus speeds, which is the main desired feature of CAN XL.

If we consider a CAN XL compliant controller coupled with a CAN transceiver in accordance with an embodiment herein, the new CAN XL Physical Layer may be configured to switch between the two voltage level schemes through a control mechanism between the CAN XL Controller (or protocol controller thereof) and the CAN Transceiver. The transceiver is usually a very simple device not knowing the protocol to be transported. So, the CAN XL controller may be configured to provide this switching information. For the present disclosure it is not of relevance how this control is done. It can be easily understood, that an old CAN FD controller cannot deliver this switching signal, because it was developed at a time when CAN XL was not known. As such, a module with a CAN FD controller in combination with a CAN transceiver in accordance with an embodiment herein cannot be switched to the CAN XL voltage level scheme while other nodes are using the CAN XL protocol.

One or more examples described herein propose to have a detection mechanism inside the CAN Transceiver, which may autonomously execute the switching between the two voltage level schemes based on observation of the voltage levels on the bus. If there is CAN XL traffic on the bus lines, the exemplary CAN Transceiver may be configured to forward an according level to the RXD connection 204 of the connected CAN FD controller 201 keeping it reliably in the protocol exception state until the CAN XL frame ends.

In one or more examples, the CAN transceiver described herein may be used in all nodes regardless of the CAN controller (or protocol controller thereof) to which it is coupled. Accordingly, the CAN transceiver described herein in the examples that follow may be coupled with a CAN FD compliant controller (e.g. one that is not capable of communication under the CAN XL protocol) or a CAN XL compliant controller (e.g. one that is capable of communication under CAN XL and CAN FD for at least the arbitration phase). If this is the case, both protocols can be used simultaneously on the same bus 105 with interleaved message formats. "Old" nodes with CAN FD controllers may only need to be upgraded with a new CAN transceiver. This is a minor change and can be done when the CAN transceiver as described herein is available. It may take a longer time until all controllers 201 with the CAN protocol are upgraded towards CAN XL controllers.

The CAN XL protocol is defined to be a superset of CAN FD and the classical CAN protocol. As such, a CAN XL module may as well use the CAN FD protocol or even the classical CAN protocol depending on configuration/programming of the CAN XL controller.

CAN FD and CAN XL both use the identical bus access mechanism and bus voltage level scheme through the so-called bit wise arbitration as defined for CAN in ISO11898. As such, both CAN variants are interoperable and with that backwards compatible. As long as the CAN FD node is winning the bus access through a higher priority in the identifier, the CAN FD protocol continues through the rest of the frame with the known bus voltage level scheme as used in CAN and CAN FD. A CAN XL controller is capable per definition of the CAN XL Standard to understand the CAN FD signalling.

Figure 3:
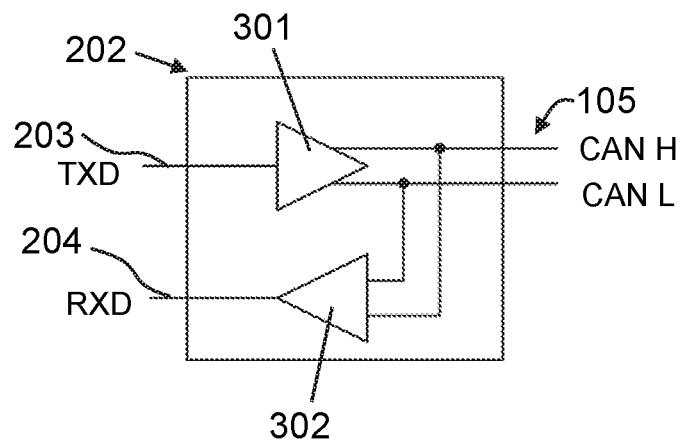
FIG. 3 shows an example CAN transceiver having a transmitter arrangement and a receiver arrangement.

FIG. 3 shows a general arrangement of a CAN transceiver 202 including the transmit input for coupling to the TXD connection 203 and the receive output for coupling to the RXD connection 204. The transceiver 202 comprises a transmitter arrangement 301 for receiving digital transmit data from the transmit input and for coupling to the bus 105 to provide differential signalling based on the transmit data to the two wires of the bus 105. The transceiver 202 comprises a receiver arrangement 302 for receiving signalling from the bus 105, the receive arrangement configured to provide a digital output signal to the receive output based on a differential signal received from the bus 105.

Figure 4:
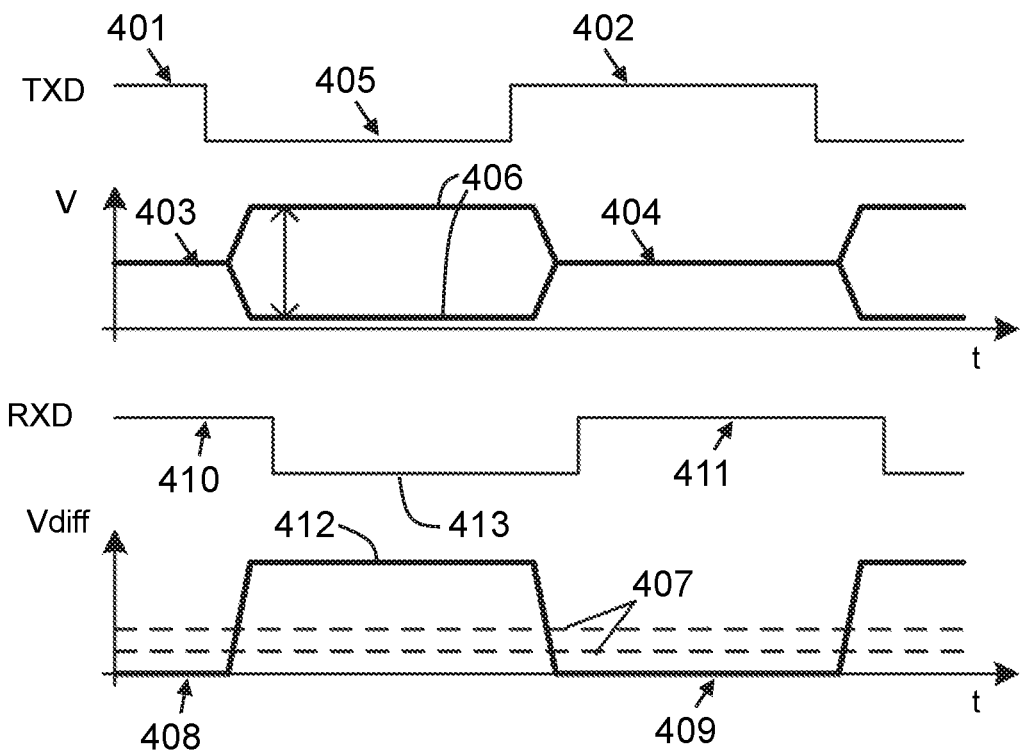
FIG. 4 shows an example timing diagram illustrating a transmit signal and the corresponding signalling applied to the CAN bus, and a received digital output signal derived from a differential signal obtained from signalling on the CAN bus, according to the CAN or CAN FD protocol.

A transceiver according to the state of the art for CAN systems may use a voltage level scheme as defined in the ISO 11898-2:2016 standard. FIG. 4 illustrates an example timing diagram showing such a voltage level scheme. Logic high bits, also known as recessive bits, in the transmit data at 401, 402 are represented with 0V differential at 403, 404, while logic low bits, also known as dominant bits, at 405 are represented with a positive differential voltage between +1.5V to +3V, shown by the different voltage levels at the CANH wire and CANL wire of the bus at 406. As such the transmitter arrangement 301 is converting a logical "1" (high level, also known as recessive) to a 0V differential output voltage and a logical "0" (low level, also known as dominant) into a positive differential voltage between +1.5V up to +3V.

The receiver arrangement 302 connected to the RxD connection 204 is converting the differential voltage back into logical levels. Again, in accordance with the ISO 11898-2:2016 standard the receiver arrangement 302 switches with a threshold voltage or threshold voltage range 407 of +0.5V up to +0.9V differential between the logical states. In case the differential bus voltage (Vdiff) is below +0.5V as at 408 and 409, the receive arrangement outputs "1" (high level, also known as recessive) as shown at 410 and 411. If the bus voltage is higher than +0.9V as at 412, the receive arrangement outputs "0" (low level, also known as dominant), as at 413.

One of the aims for CAN XL is that the communication speed shall be improved towards the maximum that is physically possible. The voltage level scheme as defined in the ISO11898-2:2016 is not optimized for that purpose due to several reasons.

First, the arbitration mechanism needs to make sure that the bus becomes relatively high-ohmic (this is, why that state is called "recessive") for the logical state "1" (high). This high ohmic state can be overridden by another sender with a low-ohmic "0" (this is, why it is called "dominant"). Second, this same mechanism is used through all the CAN FD frames to signal a detected error on the bus lines. Any node may override a sender at any time during his recessive bit phases and with that, stop a transmission on the fly.

"High ohmic" driven bits are rather slow and have other draw backs in practice. Long physical bus cables with multiple branches create a lot of reflections and may corrupt the high-ohmic bits.

The CAN XL voltage level scheme may be more optimized for maximum signal performance on the bus 105. Since the Arbitration phase used for determining bus access stays the same in CAN XL (for backwards compatibility), a CAN XL Transceiver may use the new voltage level scheme only after the Arbitration phase is complete and the CAN XL controller has won access to the bus. At that moment in time the CAN XL Transceiver may switch to the new voltage level scheme and boost the speed on the bus 105. Intentionally, the CAN XL protocol may not allow any other node to override data bits. The high ohmic output behaviour could be avoided and all bit levels are driven with more optimum strength.

Figure 5:
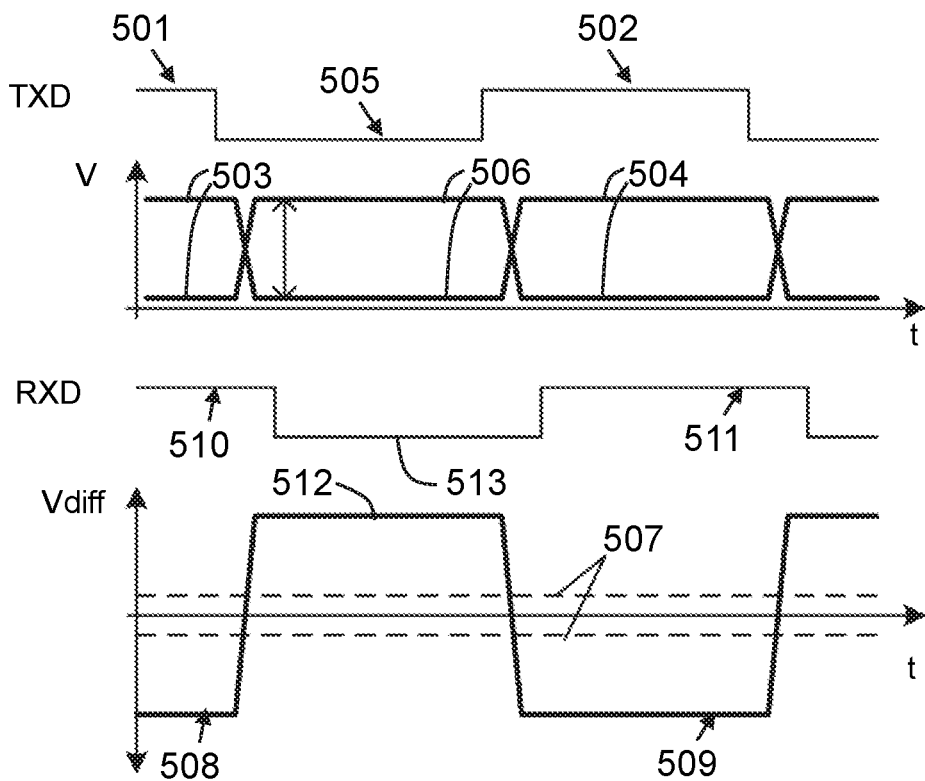
FIG. 5 shows an example timing diagram illustrating a transmit signal and the corresponding signalling applied to the CAN bus, and a received digital output signal derived from a differential signal obtained from signalling on the CAN bus, according to the proposed CAN XL protocol.

Example FIG. 5 shows an example timing diagram showing a proposed CAN XL voltage level scheme.

In the previous level scheme bits were described as recessive or dominant. However, in the proposed scheme there are no recessive bits.

Logic high bits in the transmit data at 501, 502 are represented with a negative differential signal (i.e. =CANH-CANL), shown by the different voltage levels at the CANH wire and CANL wire of the bus at 503, 504. Logic low bits at 505 are represented with a positive differential voltage, shown by the different voltage levels at the CANH wire and CANL wire of the bus at 506. As such the transmitter arrangement 301 is converting a logical "1" (high level) to a negative differential output voltage between −0.6V and −1V and a logical "0" (low level) into a positive differential voltage between +0.6V and +1V.

The receiver arrangement 302 connected to the RxD connection 204 is converting the differential voltage back into a digital output signal with logical levels. The receiver arrangement switches with a threshold voltage or threshold voltage range 507 of −0.1V to +0.1V differential between the logical states. In case the differential bus voltage (Vdiff) is below −0.1V as at 508 and 509, the receive arrangement outputs "1" (high level) as shown at 510 and 511. If the bus voltage is higher than +0.1V as at 512, the receive arrangement outputs "0" (low level), as at 513.

For CAN XL Transceivers a mechanism is defined which triggers the switching between the voltage level schemes shown in FIGS. 4 and 5. This mechanism changes the Transmitter behaviour from the known ISO11898-2:2016 level scheme towards the new proposed one for CAN XL and vice versa. The same mechanism may be used for switching the receiver thresholds between the voltage level schemes. There are multiple mechanisms defined in the draft CAN XL standard proposal relating to how this mode switching is executed. For example, a dedicated interface pin from the controller 201 towards the transceiver 202 may be used.

Figure 6:
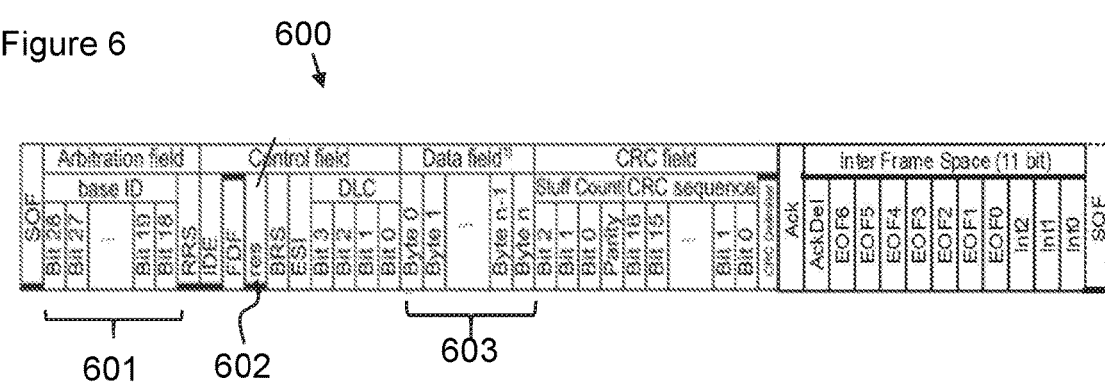
FIG. 6 shows an example CAN frame format illustrating a bit position in which the upcoming presence of non-CAN or non-CAN FD signalling, such as CAN XL, on the CAN bus can be indicated.

FIG. 6 illustrates an example CAN FD frame format 600 (here the CAN FD Base Frame Format with 11-bit Identifier). Following a series of bits 601 used for the arbitration process there comprises a reserved bit 602 for signalling the use of the protocol exception state for any CAN FD controller on the network 100 or, for nodes that support CAN XL, the reserved bit may signal the upcoming use of the CAN XL protocol. The data field 603 may therefore contain CAN FD compliant signalling if the bit 602 is dominant and the data field 603 may contain CAN XL compliant signalling if the bit 602 is recessive. Thus, the bit 602 may be considered to be where the transition from the CAN FD protocol towards the CAN XL protocol takes place. If this reserved bit is dominant (logic 0) on the bus lines, this is a CAN FD frame and all following bits follow the CAN FD protocol rules as shown in the FIG. 6. If this reserved bit is recessive on the bus (logic 1), all following bits may follow the CAN XL protocol rules (not shown in the FIG. 6).

Figure 7:
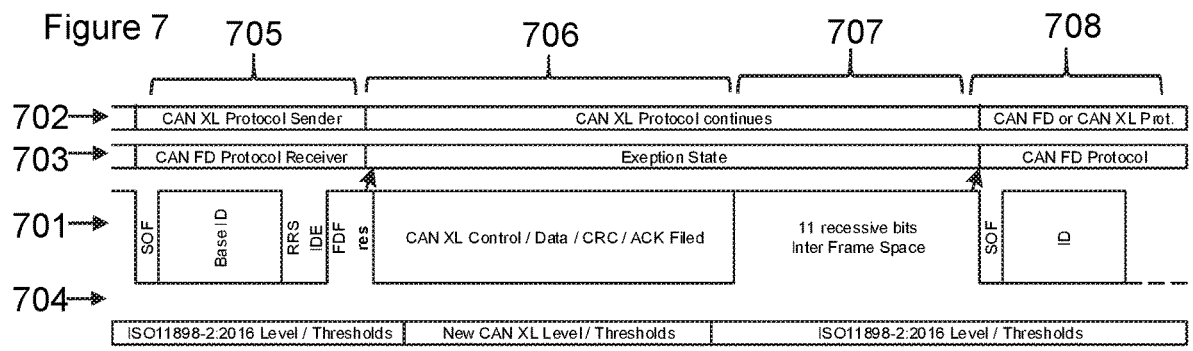
FIG. 7 shows an example timing diagram in which non-CAN or non-CAN FD signalling, such as CAN XL signalling, is provided while a CAN FD node is in a protocol exception state.

FIG. 7 shows an example timing diagram illustrating the bits received 701 on the bus 105, the state of a CAN XL node at 702 in response to said bits, the state of a CAN FD node at 703 in response to said bits and the voltage level scheme used in the bus at 704. The period 705 comprises the arbitration phase in which the CAN XL node, in this example, wins arbitration. The reserved bit 602 is placed in the logic 1 state by the winning node and this is transmitted on the bus. Accordingly, the CAN XL node is shown as continuing the CAN XL protocol and, during period 706, the CAN FD node receives the recessive logic 1 reserved bit 602 and places itself in the protocol exception state. Once a CAN FD controller discovers this reserved bit to be recessive, it enters the "Protocol Exception State" ignoring all traffic on the bus from now on. The CAN FD controller will stay in this state as long as it does not see a period of predetermined length on the bus and respectively at the receive input from the RXD connection with a contiguous recessive state.

So, normally, as long as the CAN XL node is still sending signalling to the bus, the CAN FD node(s) remain in the Protocol Exception State because they see the bus activity includes dominant signalling caused by the CAN XL signalling on the bus 105.

Similar to all CAN protocol flavours like CAN FD or classical CAN, the proposed CAN XL frames also end with 11 consecutive bit times in a recessive logic 1 state until a next frame may start. For these 11 consecutive recessive bit times, there are no bit transitions anymore on the bus and with that on the RXD connection 204 of the CAN FD controllers in the CAN FD modules. These 11 recessive bits defined in CAN XL also serve to provide the predetermined time of contiguous recessive signalling required to signal that the CAN FD controller(s) can leave the Protocol Exception State. So, after 11 bit times of silence in recessive state, all nodes are active again and a new negotiation period on the bus 105 may start through the next Arbitration Phase 708. Considering the voltage level scheme 704, the CAN FD voltage level scheme is used during the arbitration phase 705, the predetermined time of recessive signalling to leave the protocol exception state 707 and the next arbitration phase 708. During the data phase 706 in which a CAN XL controller has won arbitration, the CAN XL voltage level scheme is used. The transition back to ISO11898-2:2016 level scheme happens at some non-relevant bit position at the end of the CAN XL frame but before the predetermined time period, also known as the Inter Frame Space 707, starts.

Thus, provided that dominant signalling is visible to the CAN FD controllers during the data phase 706, it can be understood that it is possible to mix CAN FD with CAN XL nodes in one and the same bus system. This mechanism only works if the CAN FD node in Protocol Except State can observe the bus activity by the RXD connection 204 while the CAN XL node is transmitting their bits on the bus.

Unfortunately, the CAN XL voltage level scheme makes use of voltage levels on the bus that cannot be guaranteed to be seen by all CAN FD transceivers. Accordingly, the RXD connection 204 at CAN FD nodes may not see activity on the bus when there is CAN XL signalling on the bus. It might be under some conditions, that the bus levels in the CAN XL data phase 706 are lower than the maximum receiver threshold of +0.9V used by CAN transceivers to differentiate between logic 1 and logic 0 signalling in the ISO 11898-2: 2016 standard. In particular, the minimum voltage of a CAN XL data bits may be just +0.6V, less than the maximum receiver threshold of +0.9V and as such are not necessarily visible anymore on the RXD connection of the CAN FD compliant nodes. Instead, a controller would see a permanent recessive state (logical "1" on RXD) and after 11 consecutive bit times would leave the protocol exception state. The consequence would be that these nodes regard the bus to be free and would start transmission while in the background the CAN XL nodes are still using the bus with the other, CAN XL voltage level scheme.

Figure 8:
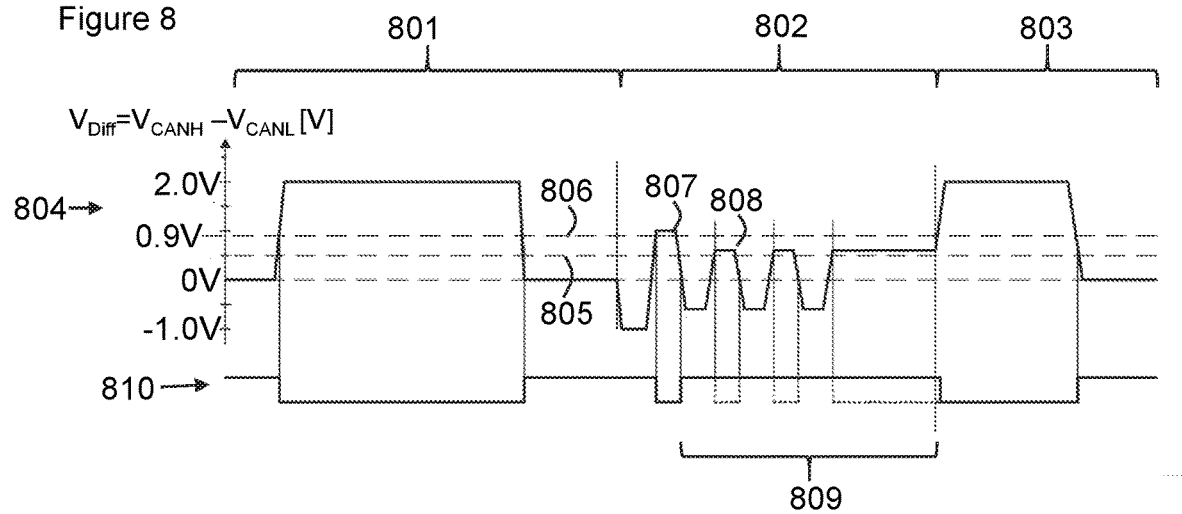
FIG. 8 shows a first example of a differential signal obtained from CAN bus signalling according to CAN FD which switches to CAN XL and back to CAN FD.

Example FIG. 8 shows a period 801 of CAN FD signalling followed by a period 802 of CAN XL signalling followed by a further period 803 of CAN FD signalling. As mentioned, the thresholds used by a CAN transceiver to differentiate between logic 1 and logic 0 from the differential signal 804 (CANH-CANL) obtained from the signalling on the CAN bus is between +0.6V and +0.9V shown as lines 805 and 806. In the periods 801 and 803 the high and low levels are clearly above and below these thresholds and therefore the distinction between a logic 1 and a logic 0 is clear. However, in case of the CAN XL bus amplitudes in period 802, the differential signal has a voltage that is near the threshold 806 and threshold 805. Thus, the CAN XL signalling may not exceed the lower threshold 805 or upper threshold 806 boundary, such as due to production spread, temperature conditions or cable losses. Accordingly, the receive output at the RXD connection 204 at a CAN FD node might show a permanent logical "1" and with that regard the bus to be idle and thus leave the Protocol Exception State after 11 bit times. That would lead to potential bus collisions and failure scenarios. Thus, a typical CAN XL dominant logic 0 signal may have a differential voltage of around +1V, as shown by signal 807, and may therefore be detected by a CAN transceiver using a threshold between +0.6V and +0.9V. However, a low or minimum CAN XL dominant logic 0 signal may have a voltage of around +0.6V (or less accounting for losses), as shown by signal 808. Accordingly, there is a chance that a CAN transceiver, such as one using a threshold of nearer +0.9V will not see the signal 808 as a dominant logic 0 signal and instead provides, in error, a digital output signal that reports a recessive logic 1 signal. As shown at 809 in trace 810, the digital output signal does not show the occurrence of the signal 808 nor subsequent CAN XL signalling until period 803 in which the voltage level scheme switches back to the CAN FD voltage levels. The period 809 may be longer than the predetermined time required to trigger the CAN FD controller to leave the protocol exception state.

Thus, the voltage thresholds used by a CAN FD transceiver may be problematic. It should be understood that a CAN FD controller has no means to switch or change the threshold used by the connected transceiver towards a different receiver threshold. Such a function was not foreseen at the development of CAN FD. So, the CAN FD node leaves the transceiver within the ISO119898-2:2016 level scheme and receiver thresholds are +0.5V to +0.9V.

FIG. 8 assumes the transition from ISO levels to CAN XL levels within a recessive bit state and the transition back during a dominant bit state.

Figure 9:
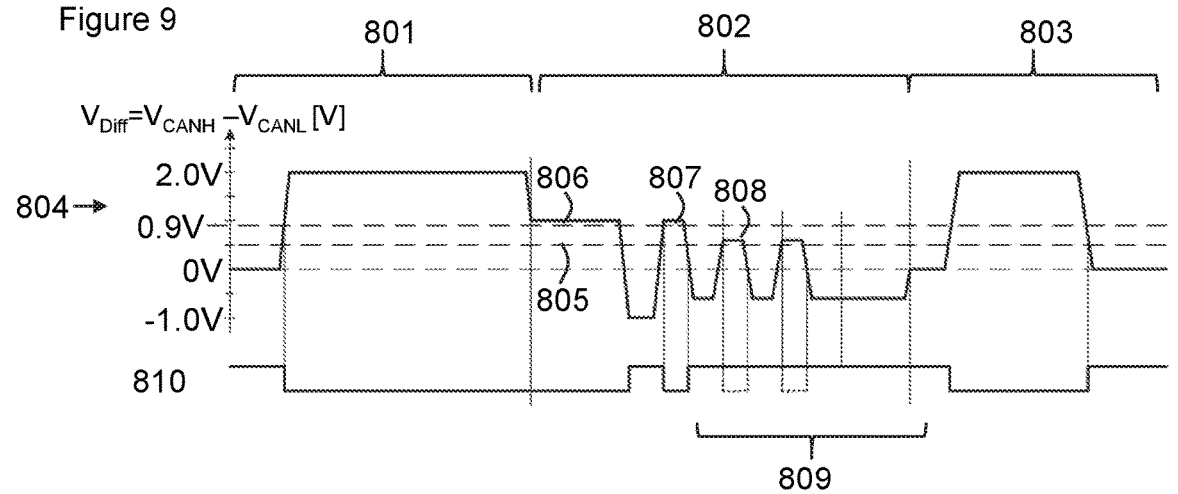
FIG. 9 shows a second example of a differential signal obtained from CAN bus signalling according to CAN FD which switches to CAN XL and back to CAN FD.

In example FIG. 9 the same mechanism is demonstrated for a transition from CAN FD levels to CAN XL levels within a dominant state and the transition back during a recessive bit state. Both scenarios are potentially possible but lead to the same problem in the digital output signal provided to the RXD connection 204. With too low signal amplitudes during the CAN XL phase, there is potentially a permanent recessive state signalled on the RXD pin, which may initiate the too early exit from the CAN FD protocol exception state.

While a CAN FD transceiver may not have means to change the threshold voltages used by the receiver arrangement thereof, a CAN XL transceiver should be able to switch between different receiver arrangement thresholds to ensure reliable differentiation between logic 0 and logic 1 signals sent using CAN FD compliant signalling and CAN XL signalling using their different voltage level schemes.

A CAN XL Transceiver needs to have measures to change the receiver threshold form the ISO11898-2:2016 levels of 0.5V to 0.9V towards the CAN XL defined threshold voltages of −100 mV to +100 mV. This can be achieved through different implementations like, for example, two dedicated receivers or input comparators or a single comparator, which can be switched between the two threshold ranges.

Figure 10:
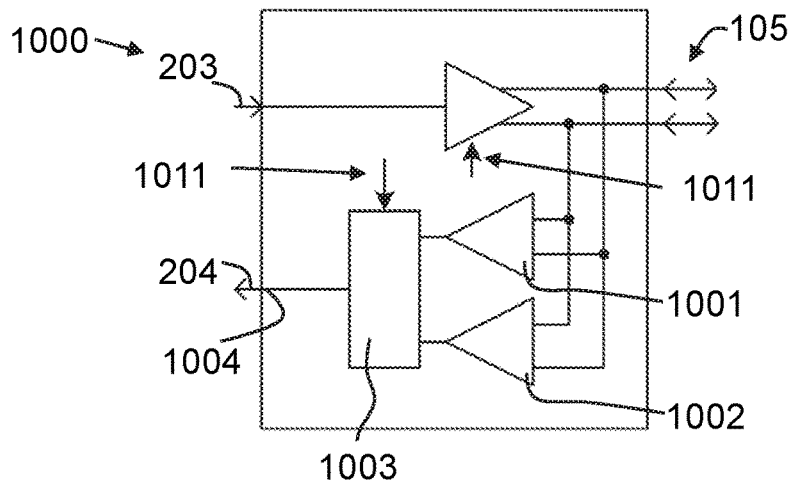
FIG. 10 shows an example CAN transceiver configured to receive CAN or CAN FD signalling as well as non-CAN or non-CAN FD signalling, such as CAN XL signalling.

Example FIG. 10 is illustrating a transceiver 1000 with two dedicated receivers or input comparators 1001 and 1002. It shall be noted, that the Transmitter (Tx Mode) and Receiver (Rx Mode) signals 1011 are provided by the CAN XL controller towards the transceiver and may be standardized for a CAN XL system.

The first receiver 1001 may be configured to determine the digital output signal using the CAN FD voltage level scheme with a threshold voltage of +0.5V to +0.9V. The second receiver 1002 may be configured to determine the digital output signal using the CAN XL voltage level scheme with a threshold voltage of +0.1V to −0.1V. A multiplexer 1003 determines which receiver, 1001 or 1002, provides its determined digital output signal to the receive output 1004 for provision to the RXD connection 204 and on to the CAN controller. For this present disclosure, the method of switching the multiplexer 1003 is not of any relevance. However, a CAN FD controller does not have means to switch the multiplexer 1004 of the transceiver but a CAN XL controller will have the means.

For CAN XL systems a certain range of possible baud rates is defined, which are relevant for a proper detection of potential CAN XL traffic inside of the Transceiver. The CAN XL arbitration speed with ISO11898-2:2016 level scheme may go up to 1 Mbps which corresponds to 1 μs (μs also written as us herein) of minimum bit time while the data phase may go up to 10 Mbps which corresponds to 100 ns of minimum bit time. It will be appreciated that as the proposed protocol is established, the data phase may go up to different or high rates, such as 12.5 Mbps or other values and accordingly the minimum bit time for the data phase is subject to change.

It can now be derived, that the potentially shortest time out of the protocol exception state in CAN FD occurs at the highest potential Arbitration baud rate. As such, the 11 recessive bit times terminating the Protocol Exception State are expired after 11×1 ρs=11 ρs earliest. For lower used baud rates during Arbitration phase, the protocol exception state is accordingly longer. This translates to a maximum available time to detect and signal CAN XL Traffic on the RXD pin to be lips or less. This is fixed and CAN FD protocol defined limit to be guaranteed by the present disclosure.

The detection of CAN XL traffic needs to assume the fastest possible data rate during CAN XL communication, which may be 10 Mbs resulting in minimum 100 ns or longer pulses/phases on the bus. In case CAN XL would be used with higher baud rates, this time may shortened accordingly. Multiple consecutive bits with the same bit level will always extend the pulse lengths and are not critical for detection. Most critical is the shortest time to be detected.

It is proposed to provide a transceiver (e.g. CAN transceiver) that may be used with a CAN controller operating in accordance with the CAN FD protocol and optionally, be used with a CAN controller operating in accordance with the CAN XL protocol. It will be appreciated that a CAN controller operating in accordance with the CAN XL protocol may also operate in accordance with the CAN FD protocol given that at least the arbitration phases are the same.

Figure 11:
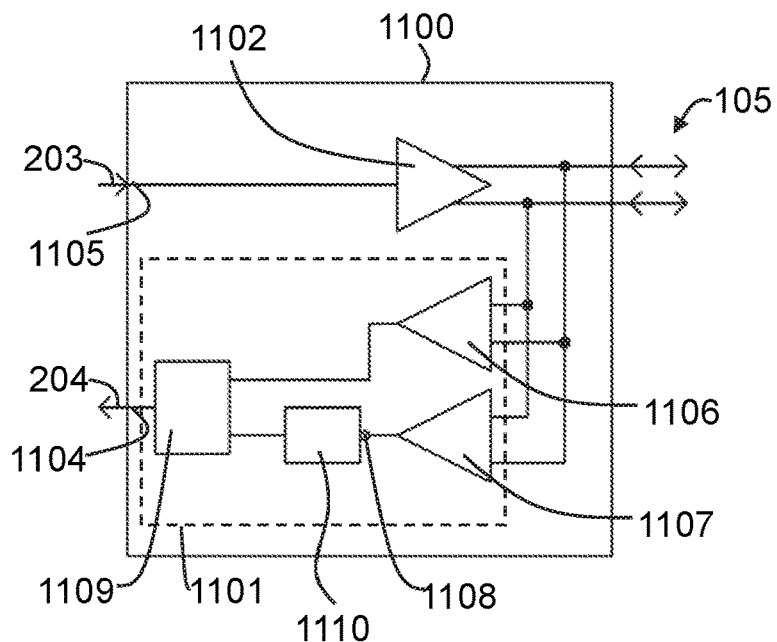
FIG. 11 shows a first example embodiment of a CAN transceiver.

FIG. 11 shows a first example embodiment of a CAN transceiver 1100 for coupling to a CAN FD controller (only TXD and RXD connections 203, 204 shown), such as a CAN FD controller that does not support CAN XL.

The CAN transceiver 1100 comprises a receiver arrangement 1101 for coupling to a CAN bus 105. The receiver arrangement 1101 is configured to determine a differential signal from analog signalling received from the CAN bus 105. The transceiver further comprises a receive output 1104 for coupling to a CAN controller and wherein the receiver arrangement 1101 is configured to provide a digital output signal to the receive output 1104 based on the differential signal. In one or more examples, the transceiver 1100 further comprises a transmit input 1105 for coupling to said CAN controller and to receive a transmit signal therefrom. The CAN transceiver 1100 further comprises a transmitter arrangement 1102 coupled to the transmit input 1105 to receive the transmit signal and is configured for coupling to the CAN bus 105. The transmitter arrangement is configured to provide analog signalling to the CAN bus based on the transmit signal.

The receiver arrangement 1101 is configured to operate in at least a first mode. Further modes of operation will be described later. In the first mode, the receiver arrangement 1101 is configured to provide the digital output signal comprising logic 0 when the differential signal is greater than a first receiver threshold and provide the digital output signal comprising logic 1 when the differential signal is less than said first receiver threshold unless said differential signal, derived from the bus wires, satisfies a condition, whereupon the receiver arrangement is configured to provide the digital output signal comprising logic 0, wherein the condition at least comprises the differential signal being below an activity-voltage threshold.

Accordingly, the receiver arrangement 1101 may be configured to determine the differential signal from the signalling from the CAN bus 105 and compare the differential signal to the first receiver threshold voltage and the activity-voltage threshold voltage to determine the digital output signal to provide to the receive output 1104. In one or more examples, the activity-voltage threshold is below the first receiver threshold. In particular, the first receiver threshold voltage may be used to determine between logic 0 and logic 1 of the CAN FD voltage level scheme and may therefore lie between +0.5V and +0.9V or may comprise the range +0.5V to +0.9V. The activity-voltage threshold is used to reliably determine CAN XL activity on the CAN bus 105. As will be appreciated from FIGS. 8 and 9, CAN XL activity includes negative voltage differential signals. The CAN XL protocol may define upper and lower receiver thresholds for use by the receiver arrangement for distinguishing between logic 1 and logic 0 of CAN XL signalling. The CAN XL protocol may also define a maximum lower voltage and maximum upper voltage for the differential signal derived from the CAN XL signalling on the bus. The activity-voltage threshold may therefore be set at a value that that is less than the predefined lower receiver threshold used for detecting CAN XL signalling but greater than the maximum lower voltage for CAN XL. Thus, in one or more examples the activity-threshold voltage may be between −0.1V and −0.6V, or between −0.2V and −0.5V or about −0.4V.

In summary, the receiver arrangement may be configured to provide a digital output signal of logic 0 when the differential signal is greater than the first receiver threshold or less than the activity-threshold and provide a digital output signal of logic 1 when the differential signal is between the first receiver threshold and the activity-threshold voltage. Accordingly, in the first mode, the receiver arrangement 1101 is configured to receive analog signalling from the CAN bus with a defined voltage level scheme corresponding to the level scheme according to ISO11898:2-2016. The activity-voltage threshold may provide a convenient way of detecting CAN XL activity using only the CAN transceiver and therefore without the need to upgrade the CAN controller.

If the bus differential voltage is below the activity-voltage threshold of, for example, −0.4V, for a substantial amount of time, this is a clear indicator that the signaling in the network has entered the CAN XL protocol phase with different voltage level scheme on the bus 105.

In one or more examples, said condition further comprises the differential signal being below the activity-voltage threshold for at least a period of time greater than a persistence-time-threshold. In one or more examples, the persistence-time-threshold is less than 100 ns. In one or more examples, the persistence-time-threshold is more than 50 ns.

The persistence-time threshold may be advantageous for filtering noise originating from the bus 105 and preventing erroneous detection of CAN XL activity that would otherwise disturb the operation of a controller that operates in accordance with CAN FD. Accordingly, the receiver arrangement may include a time-based filter. There might be noise disturbances in the Arbitration phase towards negative differential voltages, which last longer than a short CAN XL bit time. In such case, a receiver arrangement with a time filter shorter than the minimum CAN XL bit time may forward unwanted dominant signals towards the RXD pin in arbitration phase. During the arbitration phase such negative differential voltages may occur systematically through signal ringing out of the wiring harness that forms the bus 105.

Example FIG. 11 also shows components of the receiver arrangement 1101 that may provide the above-mentioned functionality. In particular, the receiver arrangement 1101 may comprise a first receiver 1106 for coupling to the bus 105 and configured to compare the differential signal derived from the bus signalling with the first receiver threshold and output logic 0 when the differential signal is greater than the first receiver threshold and output logic 1 when the differential signal is less than said first receiver threshold. The receiver arrangement 1101 may comprise a second receiver 1107 configured to compare the differential signal derived from the bus signalling with the activity-voltage threshold and output logic 0 when the differential signal is less than the activity-voltage threshold and output logic 1 when the differential signal is greater than said activity-voltage threshold. It will be appreciated that the outputs described above take account of the logic NOT 1108. The receiver arrangement 1101 may comprise a logic AND combiner 1109 configured to receive the output from both the first receiver 1106 and the second receiver 1107 and provide the digital output signal to the receive output 1104 based on said outputs. The use of two receivers 1106, 1107, which may be considered to comprise comparators, and a logic AND provides a particularly advantageous implementation for the CAN transceiver.

It will be appreciated that many variations of logic may be used to implement the functionality, such a single receiver or comparator that is configured to use both the first receiver threshold and the activity-voltage threshold and switch between them. In other examples, the logic output of the comparators 1106, 1107 may be different and therefore different configuration of NOT logic may be required or the combiner 1109 may be required to comprise a logic OR or XOR combiner to provide an appropriate digital output signal. It is as well possible to use an analog-digital (A/D) converter with signal processing after that converter.

In one or more examples, to implement the condition that includes the persistence-time-threshold, the receiver arrangement 1101 may include a time-based filter 1110 configured to filter out occurrences of the condition being met, i.e. the differential signal being less than the activity-threshold, that persist for less than the persistence-time-threshold. Accordingly, a logic 0 generated by the second receiver 1107 in combination with the NOT 1108 would only be presented to the logic AND combiner 1109 if it persisted for longer than the persistence-time-threshold. It is important that the time filter 1110 does not filter out bits that comprise CAN XL signalling and therefore the time filter should be set to a value less than the minimum time period for a CAN XL bit. The data rate for CAN XL while in the data phase may go up to 10 Mbps which corresponds to 100 ns of minimum bit time. The persistence-time-threshold may therefore be less than 100 ns. In one or more examples, the persistence-time-threshold is more than 50 ns. In this and any other example embodiment, the time filter 1110 may be absent. Thus, the output from the second receiver 1107 may couple to the logic AND combiner 1109.

Figure 12:
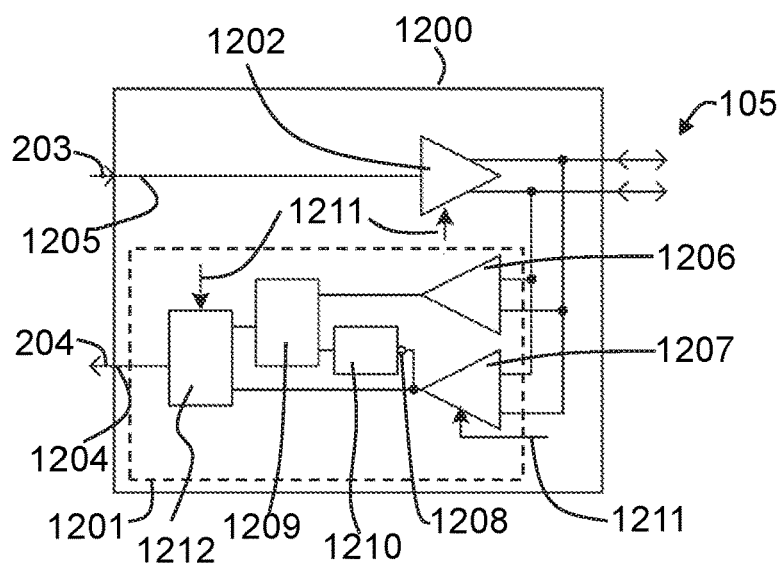
FIG. 12 shows a second example embodiment of a CAN transceiver.

Example FIG. 12 shows a second example embodiment. FIG. 12 shows an embodiment of a CAN transceiver 1200 for coupling to a CAN XL controller (only TXD and RXD connections 203, 204 shown), such as a controller that supports the CAN XL protocol and the CAN FD protocol, at least in part.

In the example of FIG. 12, the receiver arrangement 1101 is configured to operate also in a second mode. Accordingly, the receiver arrangement 1201 can operate either in the first mode or the second mode at any one time. The selection of the first mode or the second mode may be based on signalling received from the CAN controller by whatever means is provided. In the second mode, the receiver arrangement 1201 may be configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold. The second receiver threshold may be used to determine logic 0 and logic 1 for the digital receive signal based on the CAN XL signalling and thus signalling that uses the voltage level scheme of CAN XL.

In one or more examples, the activity-voltage threshold is below the second receiver threshold. In one or more examples, the second receiver threshold is below the first receiver threshold.

The implementation in FIG. 12 has the capability to switch between the use of two voltage level schemes through the use of a mode signal applied at 1211 to the transmitter arrangement 1202 to change the voltage level scheme it uses to provide signalling to the bus and at the receiver arrangement to change the voltage level scheme or voltage thresholds it uses to detect logic 1 and logic 0 in the differential signal. This implementation can be named "Active CAN XL Transceiver", because it can actively support both level schemes. It will be appreciated that the mode signal may be applied to the transmitter 1202 and the selector 1212 separately. Accordingly, the voltage level scheme used by the transmitter arrangement 1202 may be changed independently of selector 1212. The example of FIG. 12 is similar to the example of FIG. 11 and the same reference numerals have been used but incremented by 100. The main difference is that the second receiver 1207 is switchable between using the activity-voltage threshold in the first mode for detecting CAN XL activity and the second receiver threshold in the second mode for determination of the digital output signal from the differential signal derived from CAN XL signalling on the bus 105. The other main difference is the use of multiplexer or selector 1212 for selecting which output is provided to the receive output 1204; either the output from the first and second receiver 1206, 1207 and combiner 1209 when the second receiver 1207 uses the activity-voltage threshold similar to the embodiment of FIG. 11 or the output from the second receiver 1207 when it uses the second receiver threshold.

Accordingly, in the first mode, the selector 1212 passes the output of the logic AND combiner 1209 to the receive output 1204 and the second receiver uses the activity-voltage threshold. Accordingly, in the first mode the transceiver 1200 operates in the same manner as the transceiver of example FIG. 11. However, in the second mode, the selector 1212 passes the output of the second receiver 1207 to the receive output 1204 and the second receiver uses the second receiver threshold. Thus, the first mode would be activated by the controller during the arbitration phase and any other phase that uses the voltage level scheme of CAN FD as defined by ISO11898-2:2016. If the reserved bit 602 indicates the use of CAN XL in the data phase 706, then the controller may activate the second mode to enable use of the second receiver threshold and therefore receipt of the CAN XL signalling. At the end of the data phase, the controller may be configured to switch the transceiver 1200 back to the first mode. The second receiver threshold may comprise +0.1V to −0.1V.

Figure 13:
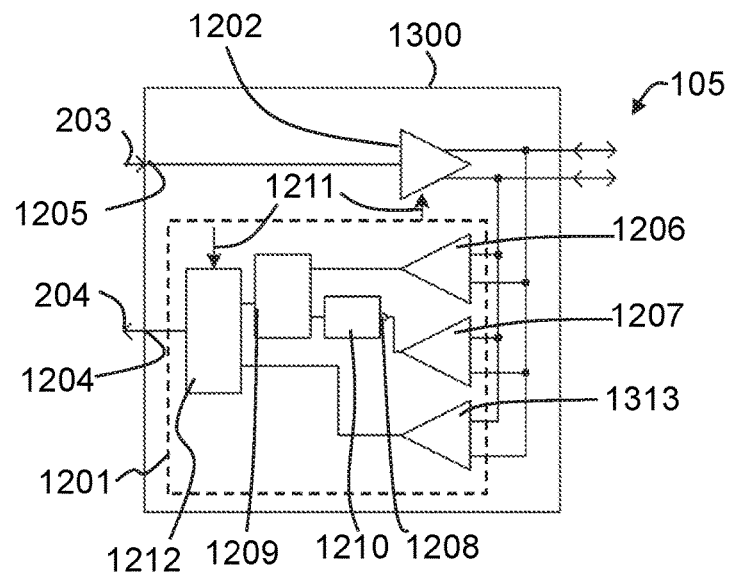
FIG. 13 shows a third example embodiment of a CAN transceiver.

Example FIG. 13 shows an alternative implementation that may make use of three dedicated receivers or comparator devices 1206, 1207 and 1313, each designed to support one of the needed threshold voltages—the first receiver threshold, the second receiver threshold and the activity-voltage threshold. Thus, in this example, the second receiver is not switchable between two thresholds and is instead configured to use the activity-voltage threshold. The third receiver 1313 is configured to use the second receiver threshold. Accordingly, in the first mode, the selector 1212 passes the output of the logic AND combiner 1209 to the receive output 1204, the logic AND combiner operating based on the output of the first receiver 1206 and the second receiver 1207. Accordingly, in the first mode the transceiver 1300 operates in the same manner as the transceiver 1100 of example FIG. 11. However, in the second mode, the selector 1212 passes the output of the third receiver 1313 to the receive output 1204 and therefore enables the receipt of CAN XL signalling.

Figure 14:
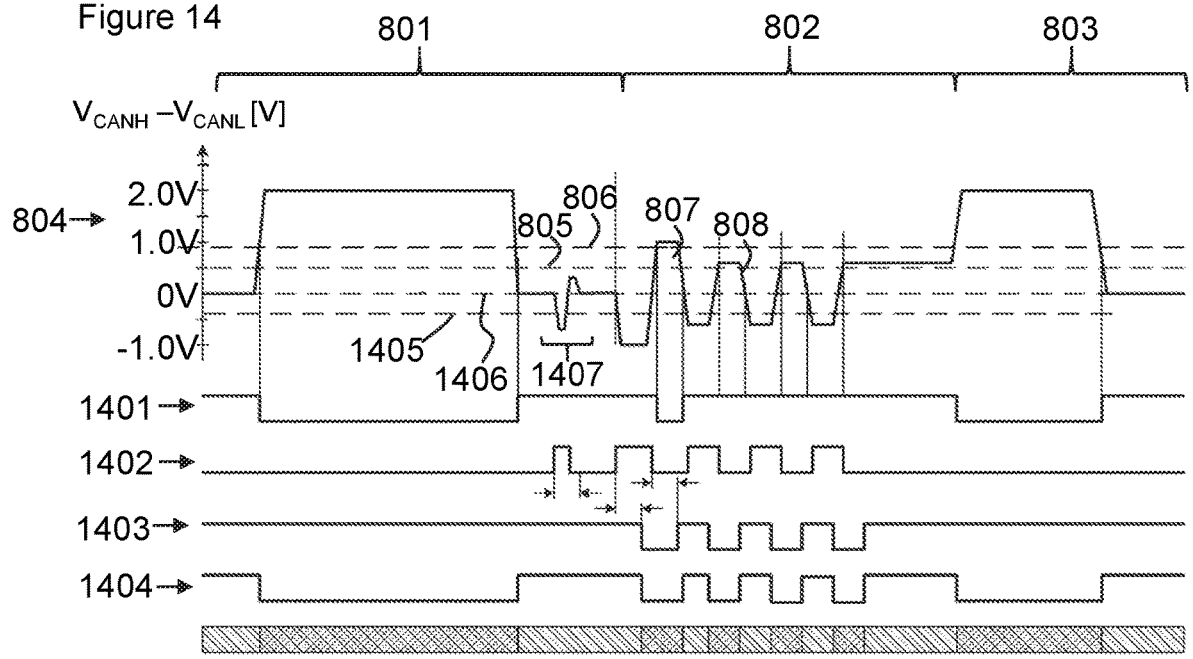
FIG. 14 shows an example timing diagram illustrating the operation of any of the first to third example embodiment CAN transceivers.

Example FIG. 14 shows a timing diagram similar to those shown in the example FIGS. 8 and 9 and the same reference numerals have been used. Example FIG. 14 includes the first receiver threshold range 805, 806 used to differentiate between logic 1 and logic 0 from the differential signal 804 (CANH-CANL) obtained from the CAN FD signalling on the CAN bus that is between +0.6V and +0.9V. Example FIG. 14 also shows the activity-voltage threshold 1405 and the second receiver threshold 1406.

Assuming the bus signals to be on the minimum amplitude during the CAN XL phase 802 on the bus, it clearly can be seen that the first comparator shown by trace 1401 that operates according ISO11898-2:2016 is not able to represent the running CAN XL traffic. The output of that first comparator would permanently show a recessive state i.e. logic 0 state during phase 802 despite signaling 808. With that recessive state the connected CAN FD controller would leave the exception state after 11 recessive bit times. The second receiver that uses the activity-voltage threshold 1405 is shown by trace 1402 and it is clearly able to follow the CAN XL bits and may be used to signal the CAN XL bits at the receive output as explained above. One could as well see that any noise disturbances 1407 during the Arbitration phase may as well cause an output signal by the second receiver at 1402. This "noise" would be forwarded directly to the receive output and the Arbitration bits may be disturbed by these unexpected pulses. Therefore, the output of the time filter 1210 is shown by trace 1403. The time filter 1110, 1210 rejects these kinds of short disturbances before the digital output signal is affected. As mentioned, the filter time may be selected to be shorter than the minimum expected bit length in the CAN XL protocol phase. As an example, for 10 Mbps with 100 ns minimum bit time, the filter is designed to be shorter than 100 ns bit time. The filter is intended to reject pulse or noise disturbances to be forwarded directly towards the receive output and shall be as long as possible. The CAN XL protocol produces guaranteed bit transitions below the activity-voltage threshold before the minimum protocol exception time of CAN FD (11 bit times recessive) would expire. Trace 1404 shows the digital output signal provided by the receiver arrangement 1101, 1201.

Figure 15:
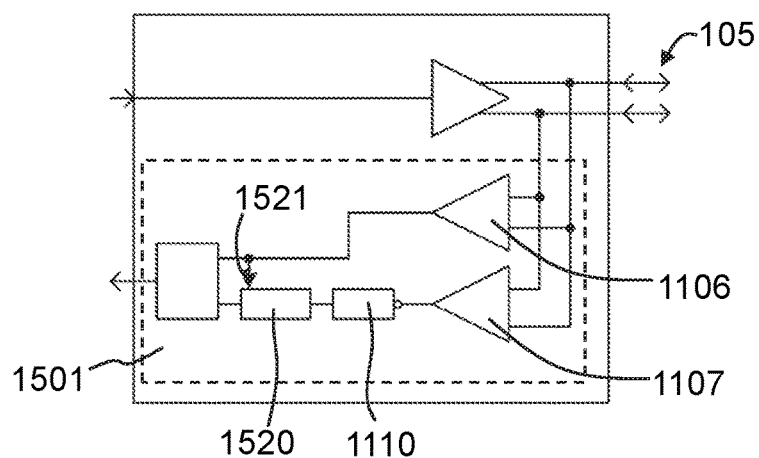
FIG. 15 shows a fourth example embodiment of a CAN transceiver.
Figure 16:
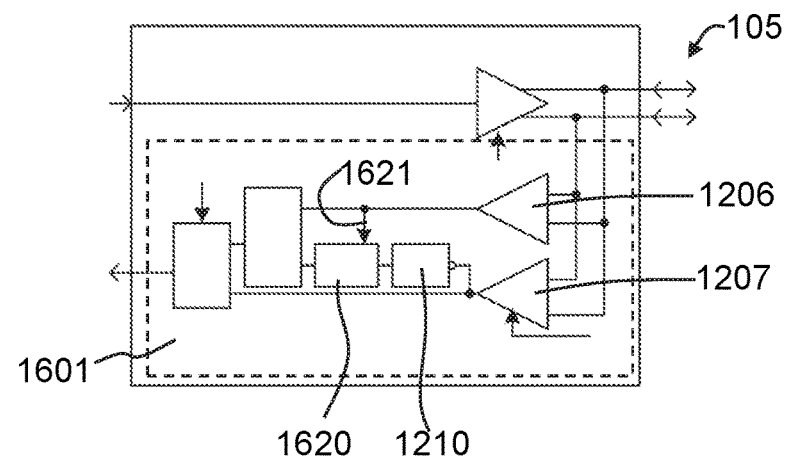
FIG. 16 shows a fifth example embodiment of a CAN transceiver.

Example FIGS. 15 and 16 disclose further embodiments similar to the embodiments of FIGS. 11 and 12 respectively. Therefore, only the differences will be described here.

Further noise filtering may be added to the receiver arrangement 1501, 1601. The further noise filtering may assist with noise disturbances in the Arbitration phase towards negative differential voltages which last longer than a short CAN XL bit time (i.e. for longer than the time filtered by the filter 1210). In such case, the receiver arrangement with a time-based filter set shorter than the minimum CAN XL bit time may forward unwanted dominant signals towards the RXD pin in arbitration phase. As mentioned previously, during the arbitration phase such negative differential voltages may occur systematically through signal ringing out of the wiring harness that forms the bus 105.

To avoid unwanted signalling, a counter 1520, 1620 may be added behind the filter 1110, 1210. The counter may provide the means to implement a further example condition.

Thus, in one or more example, said condition further comprises the differential signal being below the activity-voltage threshold a predetermined number of occurrences since the differential signal was last greater than the first receiver threshold. Accordingly, the receiver arrangement 1501, 1601 comprises the counter 1520, 1620 between the second receiver and the logic AND combiner, the counter configured to count the occurrences of the second receiver outputting logic 0 indicative of when the differential signal is less than the activity-voltage threshold and wherein the counter 1520, 1620 is configured to provide a logic 0 to the logic AND combiner based on a predetermined number of occurrences and wherein said counter is reset based on a logic 0 output from the first receiver. The reset of the counter 1520, 1620 may be provided by the signal output from the first receiver 1106, 1206 shown at 1521 and 1621.

Such a counter 1520, 1620 looks for multiple bit transitions below the activity-voltage threshold before the digital output signal is made dominant logic 0. The length of the counter is limited by the minimum Protocol Exception Termination time of 11 arbitration bit times. For 1 µs Arbitration bit time the counter latest needs to overflow after 11 arbitration bit times measured from the last dominant level in the digital output signal. Therefore, the slowest expected CAN XL data rate may be anticipated.

The counter is counting up upon detection of logic 0 signal out of the time filter 1110, 1210. If the counter has reached the predetermined number of times/occurrences, it outputs a dominant logic 0 signal towards the logic AND combiner and with that, the digital output signal becomes logic 0 dominant. The counter is reset, whenever the first receiver outputs a dominant logic 0 signal. A dominant logic 0 signal from the first receiver 1106, 1206 is a clear indication that the CAN XL phase has been left. A side effect of such counter is a memory function to the detection of the CAN XL protocol phase. With that the digital output signal stays permanently logic 0 for all the time of the CAN XL protocol phase (after the predetermined number of times has been met) which has the advantage that the bit sampling within the CAN FD controller may be more reliable.

Figure 17:
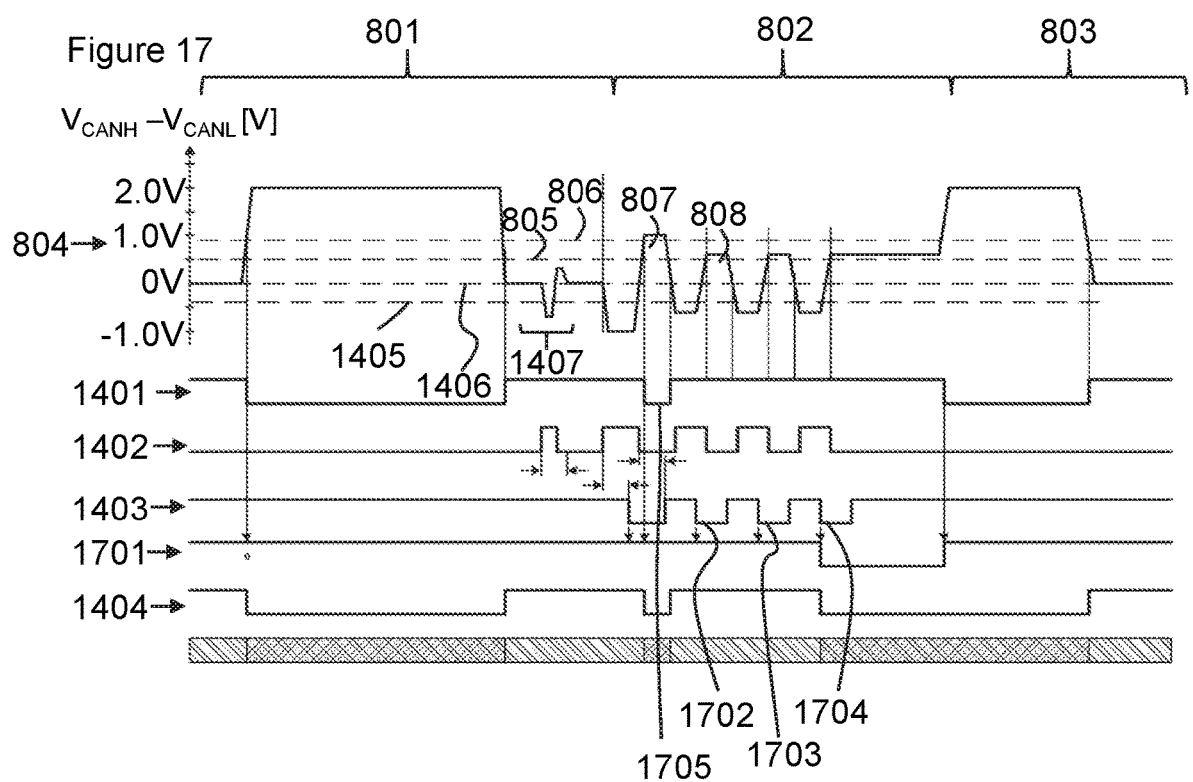
FIG. 17 shows an example timing diagram illustrating the operation of either the fourth or fifth example embodiment CAN transceiver.

Example timing diagram 17 shows the use of the counter 1520, 1620 with a predetermined number of times setting of three. It will be appreciated that any other counter value can be selected as long as the counter overflows before the time elapsed that signal the end of the Protocol Exception State Time has been reached. The example FIG. 17 is substantially similar to the diagrams of 8, 9 and 14 and will therefore not be described in detail. However, trace 1701 shows the output of the counter 1520, 1620. The last occurrence of a logic 0 from the first receiver 1106, 1206 occurs at 1705. The counter then sees three occurrences of the activity-threshold being crossed in time filter output trace 1403 at 1702, 1703 and 1704 before the output of the counter becomes logic 0. The counter is reset when the trace 1401 becomes logic 0 once again at the end of the data phase 802 and start of the phase 803.

Based on the use of the activity-voltage threshold and the proposed time filter 1110, 1210 and counter 1520, 1620, the transceiver is able to autonomously detect the currently used voltage level scheme on the bus 105 independently of the CAN controller. As such, it may be possible for the transceiver to switch between the first and second mode without the mode signaling from the controller. One can easily understand from the embodiments, that the output signal of the time filter 1100, 1210 can be memorized and used as the mode signal for the receiver arrangement internally. The advantage would be that the mode signaling for the receiver arrangement is not required to be transported from the CAN XL controller towards the transceiver. Instead, the transceiver may generate that mode signal information by itself.

It will be appreciated that other variations of the embodiments exist. For example, the transceiver 1100 of FIG. 11 may be provided without the time filter 1110 and the NOT logic 1108 may couple direct to the logic AND combiner 1109. In any of the examples, the second receiver 1107 of transceiver 1100 may provide the opposite logic outputs based on the comparison and may therefore obviate the need for the logic NOT 1108, 1208.

In any of the embodiments described herein, the first mode may be the default mode of operation.

Figure 18:
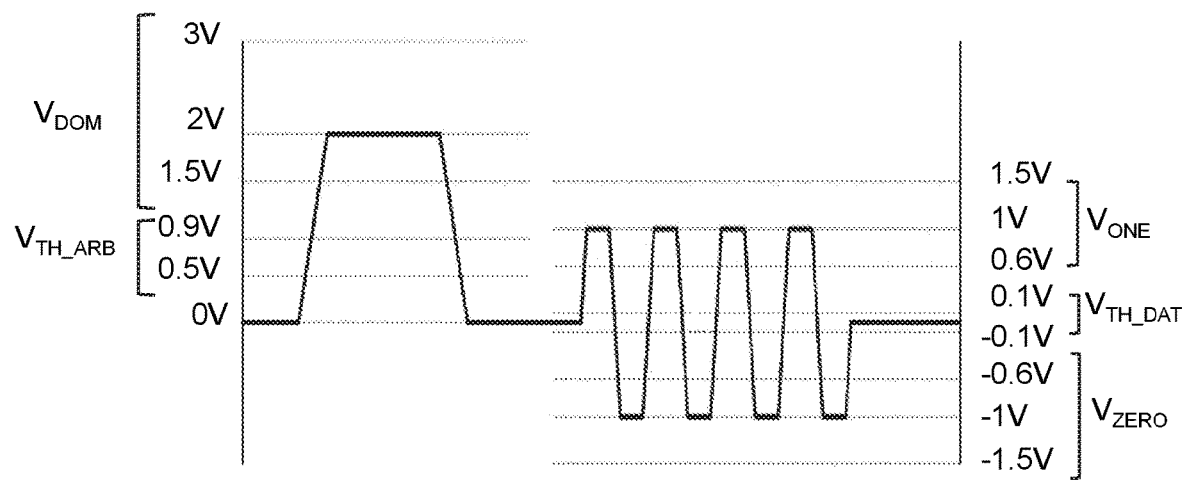
FIG. 18 shows an example of a first voltage level scheme, e.g. according to ISO11898:2-2016, alongside a second defined voltage level scheme, e.g. according to CAN XL.

FIG. 18 shows an example of a first voltage level scheme, e.g. according to ISO11898:2-2016, for example used with CAN FD or with CAN XL in the arbitration phase alongside a second defined voltage level scheme, e.g. according to CAN XL data phase.

FIG. 18 shows the differential bus voltages (VDIFF). The left-hand side shows the first voltage level scheme and the right-hand side shows the second voltage level scheme.

In this example, the first defined level scheme uses a first receiver threshold (VDIFF(TH_ARB)) between 0.5 V and 0.9 V. As can be seen from, FIG. 18, according to the first defined level scheme, analog signals with differential bus voltages above the first receiver threshold, i.e. above 0.9 V, correspond with digital output signals level 0, while analog signals with differential bus voltages below the first receiver threshold, i.e. below 0.5 V, correspond with digital output signals level 1.

In this example, the defined first level scheme further comprises a typical differential driver output voltage corresponding to digital signals level 1 (VDIFF(ZREC) Typ[V]) of 0 V, a minimum differential driver output voltage corresponding to digital signals level 1 (VDIFF(ZREC) Min[V]) of −0.5 V, a maximum differential driver output voltage corresponding to digital signals level 1 (VDIFF(ZREC) Max[V]) of 0.05 V.

In this example, the defined first level scheme further comprises a typical differential driver output voltage corresponding to digital signals level 0 (VDIFF(DOM) Typ[V]) of 2 V, a minimum differential driver output voltage corresponding to digital signals level 0 (VDIFF(DOM) Min[V]) of 1.5 V, and a maximum differential driver output voltage corresponding to digital signals level 0 (VDIFF(DOM) Max[V]) of 3 V.

In this example, the second defined level scheme comprises a second receiver threshold (VDIFF(TH_DAT)) between −0.1 V and +0.1 V. As can be seen from FIG. 18, according to the second defined level scheme, analog signals with differential bus voltages above the second receiver threshold, i.e. above +0.1 V, correspond with digital output signals level 0, while analog signals with differential bus voltages below the second receiver threshold, i.e. below −0.1 V, correspond with digital output signals level 1. In this example, the second defined level scheme further comprises a typical differential driver output voltage corresponding to digital signals level 1 (VDIFF(ZERO) Typ[V]) of −1 V, a minimum differential driver output voltage corresponding to digital signals level 1 (VDIFF(ZERO) Min[V]) of −1.5 V, and a maximum differential driver output voltage corresponding to digital signals level 1 (VDIFF(ZERO) Max[V]) of −0.6 V. In this example, the second defined level scheme further comprises a typical differential driver output voltage corresponding to digital signals level 0 (VDIFF(ONE) Typ [V]) of 1 V, a minimum differential driver output voltage corresponding to digital signals level 0 (VDIFF(ONE) Min [V]) of 0.6 V, and a maximum differential driver output voltage corresponding to digital signals level 0 (VDIFF (ONE) Max[V]) of 1.5 V.

Although the present examples mainly refer to CAN FD and CAN XL Technology the present disclosure is not limited to those CAN flavors, instead the underlying concept can be transferred to further CAN flavors.

Figure 19:
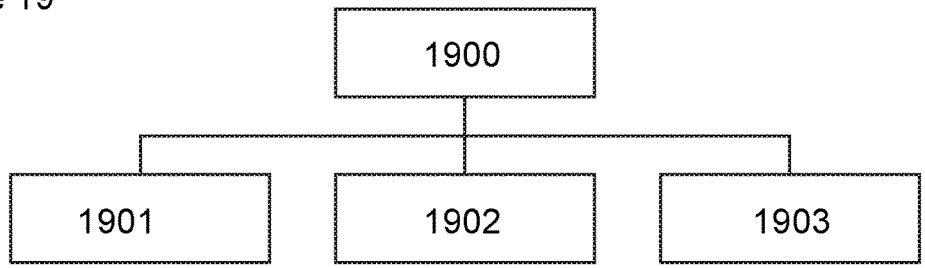
FIG. 19 illustrates an example method for operating a transceiver.

FIG. 19 illustrates an example method of operating a CAN transceiver comprising a receiver arrangement for coupling to a CAN bus, the receiver arrangement configured to determine a differential signal from analog signalling received from the CAN bus; and a receive output for coupling to a CAN controller and wherein the receiver arrangement is configured to provide a digital output signal to the receive output based on the differential signal; wherein then method comprises:

operating 1900 the receiver arrangement in at least a first mode wherein in the first mode the method comprises:

providing 1901, by the receiver arrangement, the digital output signal comprising logic 0 when the differential signal is greater than a first receiver threshold; and providing 1902, by the receiver arrangement, the digital output signal comprising logic 1 when the differential signal is less than said first receiver threshold unless said differential signal satisfies a condition, whereupon the method comprises providing 1903 the digital output signal comprising logic 0, wherein the condition at least comprises the differential signal being below an activity-voltage threshold.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A Controller Area Network, CAN, transceiver comprising:

a receiver arrangement for coupling to a CAN bus, the receiver arrangement configured to determine a differential signal from analog signalling received from the CAN bus; and a receive output for coupling to a CAN controller and wherein the receiver arrangement is configured to provide a digital output signal to the receive output based on the differential signal; wherein the receiver arrangement is configured to operate in at least a first mode in which the receiver arrangement is configured to provide the digital output signal comprising logic 0 when the differential signal is greater than a first receiver threshold and provide the digital output signal comprising logic 1 when the differential signal is less than said first receiver threshold unless said differential signal satisfies a condition, whereupon the receiver arrangement is configured to provide the digital output signal comprising logic 0, wherein the condition at least comprises the differential signal being below an activity-voltage threshold.

2. The CAN transceiver according to claim 1, wherein the CAN transceiver comprises a transmit input for coupling to said CAN controller and to receive a transmit signal therefrom, the CAN transceiver further comprising a transmitter arrangement coupled to the transmit input to receive the transmit signal and configured for coupling to the CAN bus, the transmitter arrangement configured to provide analog signalling to the CAN bus based on the transmit signal.

3. The CAN transceiver according to claim 1, wherein the activity-voltage threshold is below the first receiver threshold.

4. The CAN transceiver according to claim 1, wherein the receiver arrangement is configured to operate in a second mode instead of the first mode based on signalling received from the CAN controller wherein in the second mode, the receiver arrangement is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold.

5. The CAN transceiver according to claim 4, wherein the activity-voltage threshold is below the second receiver threshold.

6. The CAN transceiver according to claim 4, wherein the second receiver threshold is below the first receiver threshold.

7. The CAN transceiver according to claim 1, wherein said condition further comprises the differential signal being below the activity-voltage threshold for at least a period of time greater than a persistence-time-threshold.

8. The CAN transceiver according to claim 7, wherein the persistence-time-threshold is less than 100 ns.

9. The CAN transceiver according to claim 7, wherein the receiver arrangement includes a filter configured to filter out occurrences of the condition being met that persist for less than a persistence-time-threshold.

10. The CAN transceiver according to claim 1, wherein in the first mode, the receiver arrangement is configured to receive analog signalling from the CAN bus with a defined level scheme corresponding to the level scheme according to CAN protocol ISO11898-2:2016.

11. The CAN transceiver according to claim 1, wherein the activity-voltage threshold is between −0.1 Volts and −0.6 Volts.

12. The CAN transceiver according to claim 1, wherein said condition further comprises the differential signal being below the activity-voltage threshold a predetermined number of times since the differential signal was last greater than the first receiver threshold.

13. The CAN transceiver according to claim 1, wherein the receiver arrangement comprises:
   a first receiver configured to compare the differential signal with the first receiver threshold and output logic 0 when the differential signal is greater than a first receiver threshold and output logic 1 when the differential signal is less than said first receiver threshold; and
   a second receiver configured to compare the differential signal with the activity-voltage threshold and output logic 0 when the differential signal is less than the activity-voltage threshold and output logic 1 when the differential signal is greater than said activity-voltage threshold;
   a logic AND combiner configured to receive the output from both the first receiver and the second receiver and provide the digital output signal to the receive output based on said outputs.

14. The CAN transceiver according to claim 13, wherein the said second receiver is switchable between using the activity-voltage threshold for use in the first mode and a second receiver threshold for providing a second mode, wherein in the second mode the second receiver is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold and wherein the receiver arrangement includes a signal selector configured to select the output of the second receiver in the second mode for passing to the receive output and to select the output of the logic AND combiner in the first mode for passing to the receive output.

15. The CAN transceiver according to claim 13, wherein the receiver arrangement comprises a third receiver configured to use the second receiver threshold for providing a second mode, wherein in the second mode the third receiver is configured to, based on said differential signal, provide the digital output signal comprising logic 0 when the differential signal is greater than a second receiver threshold and provide the digital output signal comprising logic 1 when the differential signal is less than said second receiver threshold, the second receiver threshold different to the first receiver threshold, and wherein in the first mode, the digital output signal is determined by the output of the first and second receivers and in the second mode the digital output signal is determined by the output of the third receiver.

16. The CAN transceiver of claim 14, wherein the receiver arrangement comprises a counter between the second receiver and the logic AND combiner, the counter configured to count the occurrences of the second receiver outputting logic 0 indicative of when the differential signal is less than the activity-voltage threshold and wherein the counter is configured to provide a logic 0 to the logic AND combiner based on a predetermined number of occurrences and wherein said counter is reset based on a logic 0 output from the first receiver.

17. A method operating a CAN transceiver comprising a receiver arrangement for coupling to a CAN bus, the receiver arrangement configured to determine a differential signal from analog signalling received from the CAN bus; and a receive output for coupling to a CAN controller and wherein the receiver arrangement is configured to provide a digital output signal to the receive output based on the differential signal; wherein then method comprises:
   operating the receiver arrangement in at least a first mode wherein in the first mode the method comprises:
      providing, by the receiver arrangement, the digital output signal comprising logic 0 when the differential signal is greater than a first receiver threshold; and
      providing, by the receiver arrangement, the digital output signal comprising logic 1 when the differential signal is less than said first receiver threshold unless said differential signal satisfies a condition, whereupon the method comprises providing the digital output signal comprising logic 0, wherein the condition at least comprises the differential signal being below an activity-voltage threshold.

18. The method of claim 17, wherein the method comprises:
   operating the receiver arrangement in a second mode instead of the first mode based on signalling received from the CAN controller wherein in the second mode the method comprises:
   providing, by the receiver arrangement, the digital output signal comprising logic 0 when the differential signal is greater than a second receiver threshold; and
   providing, by the receiver arrangement, the digital output signal comprising logic 1 when the differential signal is less than said second receiver threshold, the second receiver threshold different to the first receiver threshold.

* * * * *